(12) United States Patent  (10) Patent No.: US 6,438,910 B1
Erskine  (45) Date of Patent: Aug. 27, 2002

(54) SKYLIGHT SOLAR REFLECTIVE SYSTEM (76) Inventor: Garret N. Erskine, 391 W. 40 St., San Pedro, CA (US) 90731

( * ) Notice: Subject to any disclaimer, the term of this patent is extended or adjusted under 35 U.S.C. 154(b) by 0 days.

(21) Appl. No.: 09/740,473

(22) Filed: Dec. 18, 2000

(51) Int. Cl.[7] ................................................. E04B 7/18
(52) U.S. Cl. ................................ 52/200; 52/72; 52/66; 160/99; 160/100; 160/102
(58) Field of Search ............................. 52/200, 72, 66; 160/99, 100, 102; 350/96.1, 162.11, 162.18, 258; 250/203.4, 239; 362/35, 150

(56) References Cited

U.S. PATENT DOCUMENTS

| 4,050,789 A | | 9/1977 | Herbert ....................... 350/226 |
| 4,429,952 A | | 2/1984 | Dominguez ................. 350/258 |
| 4,475,536 A | | 10/1984 | Dame .......................... 126/419 |
| 4,620,771 A | | 11/1986 | Dominguez ................. 350/258 |
| 4,672,889 A | * | 6/1987 | Lynch ............................. 52/66 |
| 4,883,340 A | | 11/1989 | Dominguez ................. 350/260 |
| 5,204,777 A | | 4/1993 | Curshod ....................... 359/596 |
| 5,493,824 A | * | 2/1996 | Webster et al. ............... 52/200 |
| 5,555,683 A | * | 9/1996 | Schroeder ...................... 52/200 |
| 5,577,492 A | | 11/1996 | Parkyn, Jr. et al. .......... 126/698 |
| 5,581,447 A | | 12/1996 | Raasakka ..................... 362/557 |
| D383,855 S | * | 9/1997 | Irvine et al. ................... D25/52 |
| 5,729,387 A | * | 3/1998 | Takahashi et al. ............. 52/200 |
| 5,897,201 A | | 4/1999 | Simon ......................... 362/268 |

* cited by examiner

Primary Examiner—Lanna Mai
Assistant Examiner—Chi Q Nguyen
(74) Attorney, Agent, or Firm—Michael S. Neustel (57) ABSTRACT A skylight solar reflective system for increasing the input of solar radiation into a skylight during low sun angles typically occurring within early morning and later afternoon and for decreasing the input of solar radiation during high sun angles typically during the middle of the day. The skylight solar reflective system includes a main bracket attachable to a frame of a skylight, a pair of end brackets attachable to an opposing side of the frame, a first arm and a second arm pivotally attached to the main bracket with the distal portions of the arms slidably received by the pair of end brackets, a first reflector attached to the first arm, a second reflector attached to the second arm, and a cross brace attached between the first reflector and the second reflector. In an alternative embodiment a third reflector may be utilized that extends between the distal portions of the first reflector and the second reflector.

20 Claims, 7 Drawing Sheets

SKYLIGHT SOLAR REFLECTIVE SYSTEM

BACKGROUND OF THE INVENTION

1. Field of the Invention

The present invention relates generally to skylights and more specifically it relates to an adjustable, passive skylight solar reflective system for increasing the input of solar radiation into a skylight during low sun angles typically occurring within early morning and later afternoon and for decreasing the input of solar radiation during high sun angles typically during the middle of the day.

2. Description of the Prior Art

Skylights have been in use for years. Typically, a skylight is comprised of a frame structure secured within the roof of a building with a window positioned within for allowing sunlight to enter into the interior portion of the building.

The main problem with conventional skylights is that they do not provide adequate lighting during the early morning and late afternoon hours because of the low sun angle. In addition, conventional skylights often times provide too much sunlight when the sun is positioned at increased angles that can undesirably increase the temperature within the interior of the building.

Examples of patented skylight devices which are illustrative of such prior art include U.S. Pat. No. 4,429,952 to Dominguez; U.S. Pat. No. 4,620,771 to Dominguez; U.S. Pat. No. 4,475,536 to Dame; U.S. Pat. No. 4,883,340 to Dominguez; U.S. Pat. No. 4,050,789 to Herbert; U.S. Pat. No. 5,204,777 to Curshod; U.S. Pat. No. 5,493,824 to Webster et al.; U.S. Pat. No. 5,577,492 to Parkyn Jr. et al.; U.S. Pat. No. 5,581,447 to Raasakka; U.S. Pat. No. 5,729,387 to Takahashi et al.; U.S. Pat. No. 5,897,201 to Simon.

While these devices may be suitable for the particular purpose to which they address, they are not as cost effective or readily adjustable for increasing the input of solar radiation into a skylight during low sun angles typically occurring within early morning and later afternoon and for decreasing the input of solar radiation during high sun angles typically during the middle of the day. Conventional skylights typically provide insufficient sunlight during early morning and late afternoon hours.

In these respects, the adjustable passive skylight solar reflective system according to the present invention substantially departs from the conventional concepts and designs of the prior art, and in so doing provides an apparatus primarily developed for the purpose of increasing the input of solar radiation into a skylight during low sun angles typically occurring within early morning and later afternoon and for decreasing the input of solar radiation during high sun angles typically during the middle of the day, and allowing for the reflector system to be adjusted so that the system can be positioned to optimize the intake of solar radiation to correspond with the lighting needs of the building occupant.

SUMMARY OF THE INVENTION

In view of the foregoing disadvantages inherent in the known types of skylight devices now present in the prior art, the present invention provides a new skylight solar reflective system construction wherein the same can be utilized for increasing the input of solar radiation into a skylight during low sun angles typically occurring within early morning and later afternoon and for decreasing the input of solar radiation during high sun angles typically during the middle of the day. In addition, the present invention can be applied to skylights of various sizes and fitted properly regardless of the skylight orientation or latitude of installation and reflectors positioned adjusted to optimize daylight output in accordance with the users needs.

The general purpose of the present invention, which will be described subsequently in greater detail, is to provide a new skylight solar reflective system that has many of the advantages of the skylight devices mentioned heretofore and many novel features that result in a new skylight solar reflective system which is not anticipated, rendered obvious, suggested, or even implied by any of the prior art skylight devices, either alone or in any combination thereof.

To attain this, the present invention generally comprises a main bracket attachable to a frame of a skylight, a pair of end brackets attachable to an opposing side of the frame, a first arm and a second arm pivotally attached to the main bracket with the distal portions of the arms slidably received by the pair of end brackets, a first reflector attached to the first arm, a second reflector attached to the second arm, and a cross brace attached between the first reflector and the second reflector.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a skylight solar reflective system that will overcome the shortcomings of the prior art devices.

A second object is to provide a skylight solar reflective system for increasing the input of solar radiation into a skylight during low sun angles typically occurring within early morning and later afternoon and for decreasing the input of solar radiation during high sun angles typically during the middle of the day.

Another object is to provide a skylight solar reflective system that regulates the input and distribution of sunlight through a conventional skylight.

An additional object is to provide a skylight solar reflective system that can be attached to various types and sizes of conventional skylights regardless of skylight orientation or the latitude of the installation.

A further object is to provide a skylight solar reflective system that reduces the requirement for conventional electric lighting within the interior of a building.

Another object is to provide a skylight solar reflective system that can be adjusted to optimize solar radiation intake to correspond with the user's needs.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 7 illustrate a skylight solar reflective system 10, which comprises a main bracket 20 attachable to a frame 14 of a skylight 12, a pair of end brackets 30 attachable to an opposing side of the frame 14, a first arm 40 and a second arm 42 pivotally attached to the main bracket 20 with the distal portions of the arms slidably received by the pair of end brackets 30, a first reflector 50 attached to the first arm 40, a second reflector 60 attached to the second arm 42, and a cross brace 70 attached between the first reflector 50 and the second reflector 60.

Figure 1:
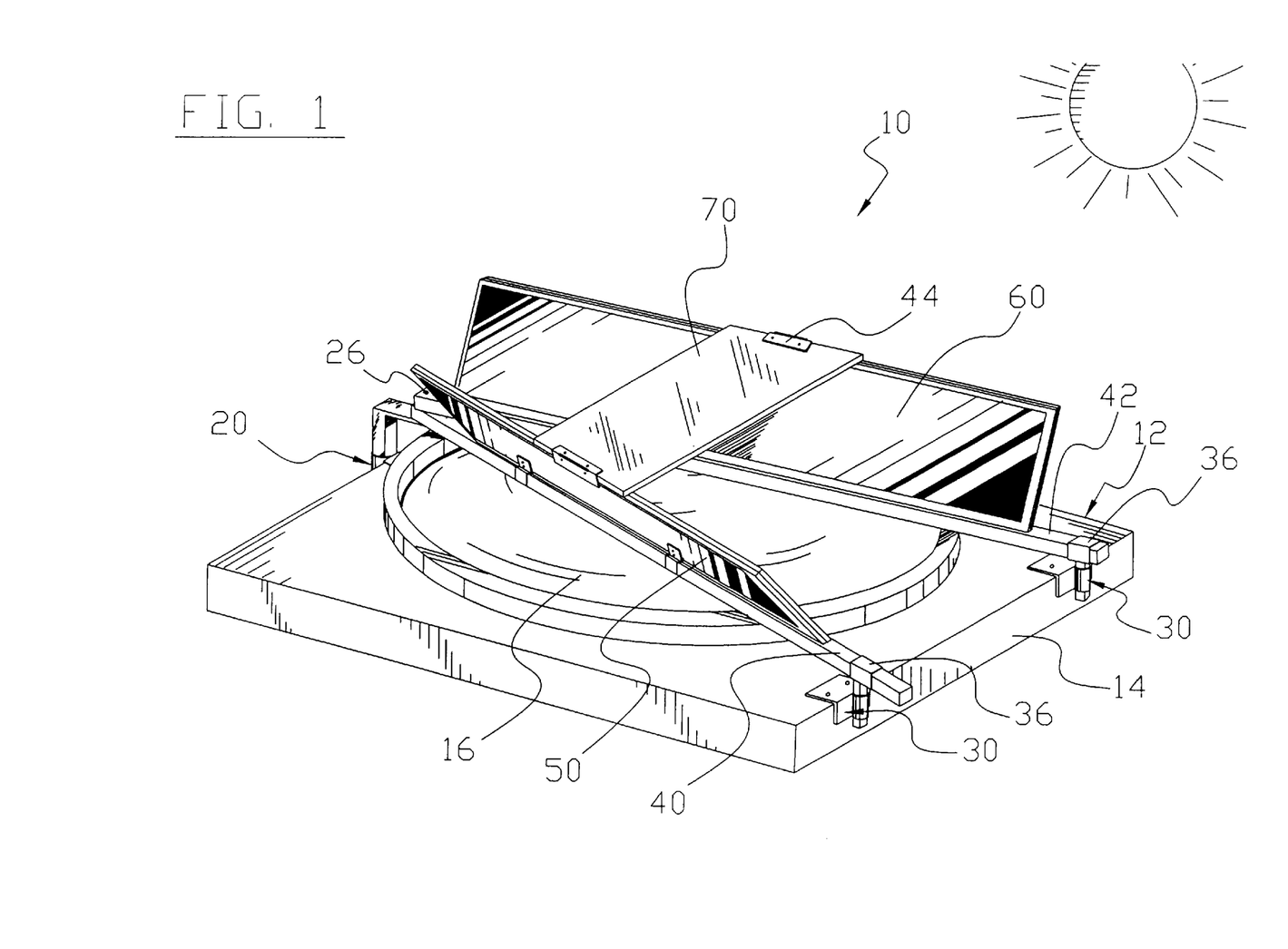
FIG. 1 is an upper perspective view of the present invention attached to a conventional skylight.
Figure 2:
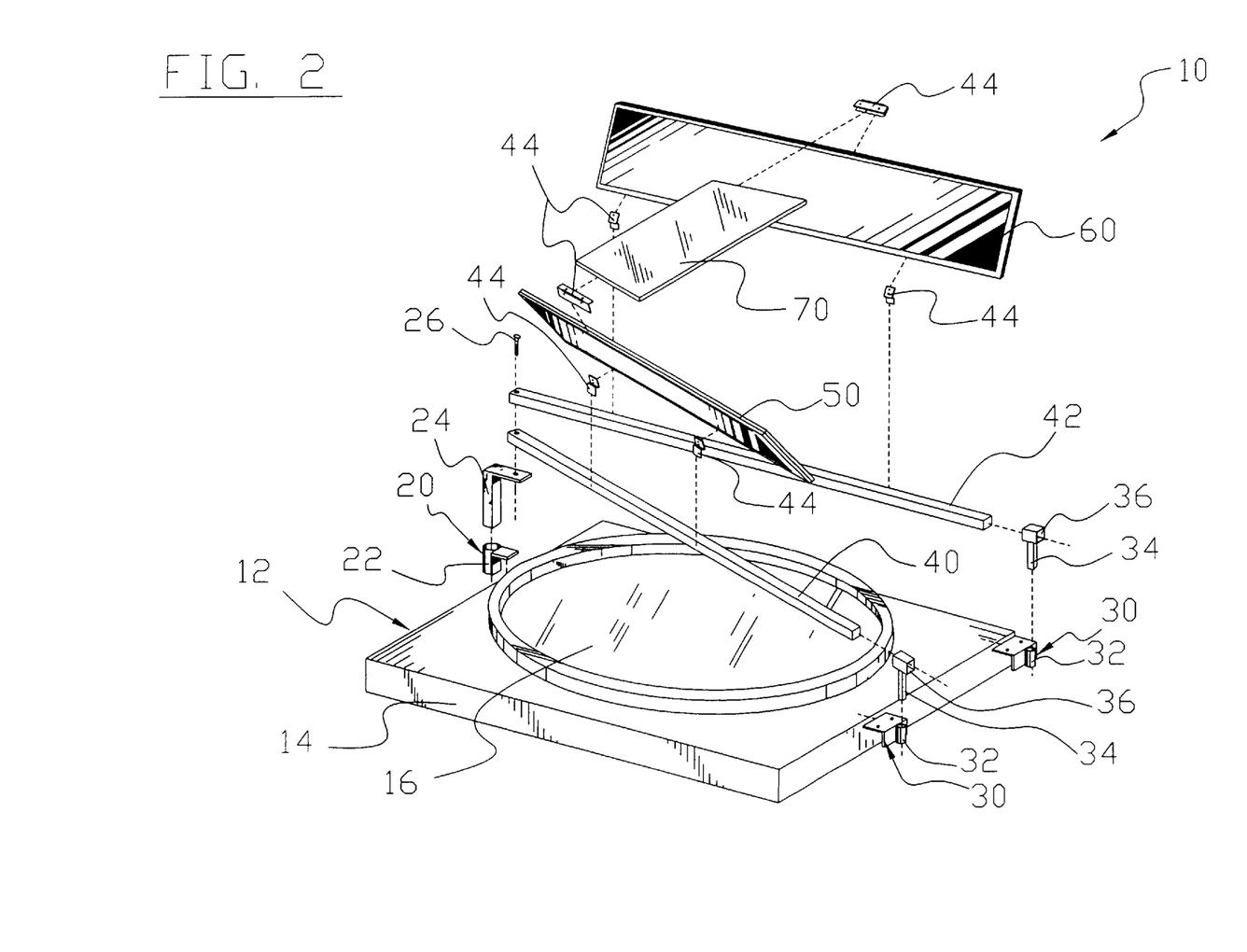
FIG. 2 is an exploded upper perspective view of the present invention with respect to a conventional skylight.
Figure 3:
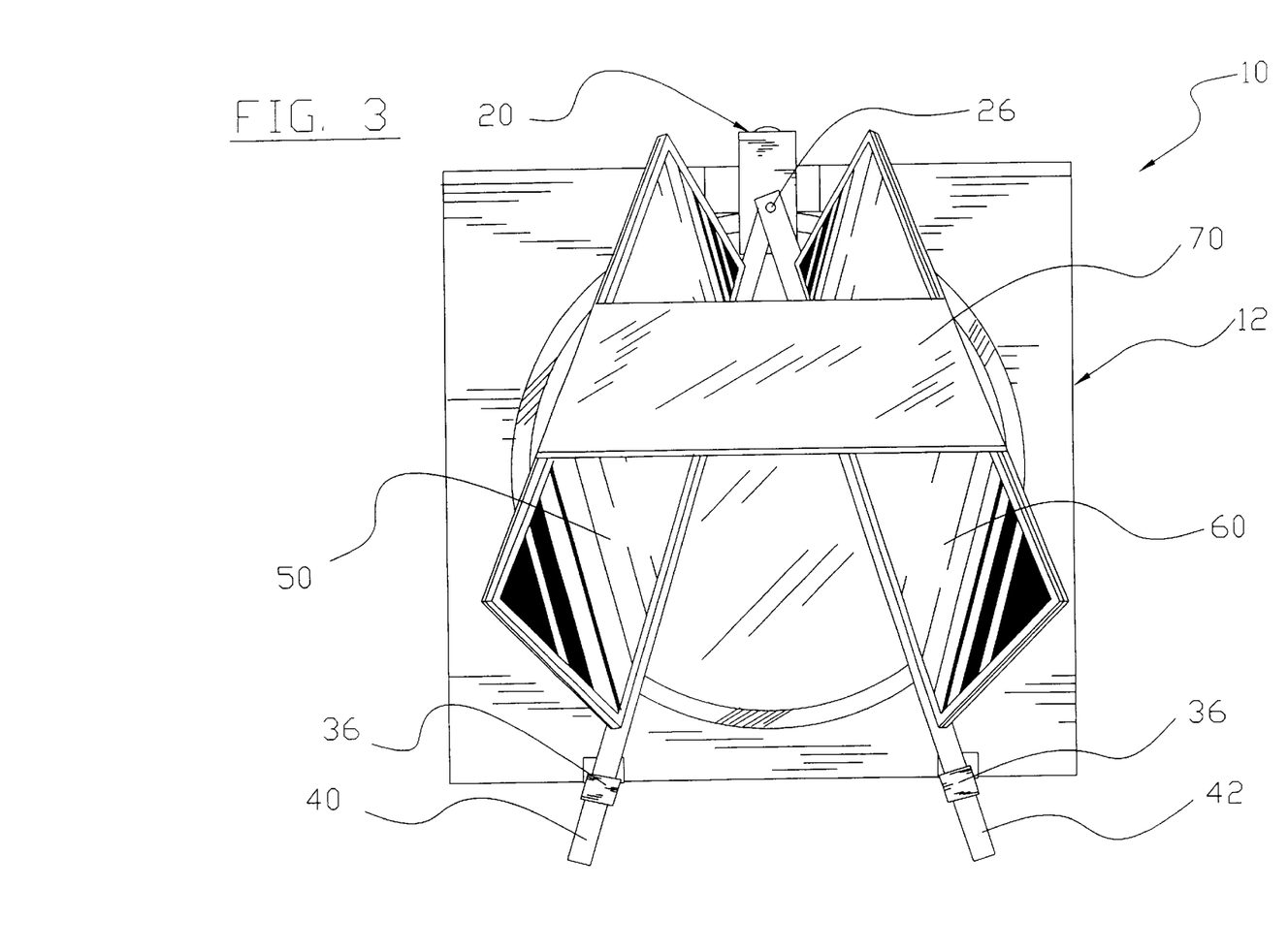
FIG. 3 is an upper rear view of the present invention attached to the conventional skylight.

As best shown in FIGS. 1 through 3 of the drawings, a conventional skylight 12 has an outer frame 14 that is attached to the roof of a building structure with a transparent or semi-transparent pane 16 positioned within. The pane 16 and frame 14 may have various shapes and configurations as are well known in the art. In addition, since the skylight 12 is not part of the invention being claimed within this application, no further discussion will be made regarding the skylight 12, as they are well known in the art.

Figure 5:
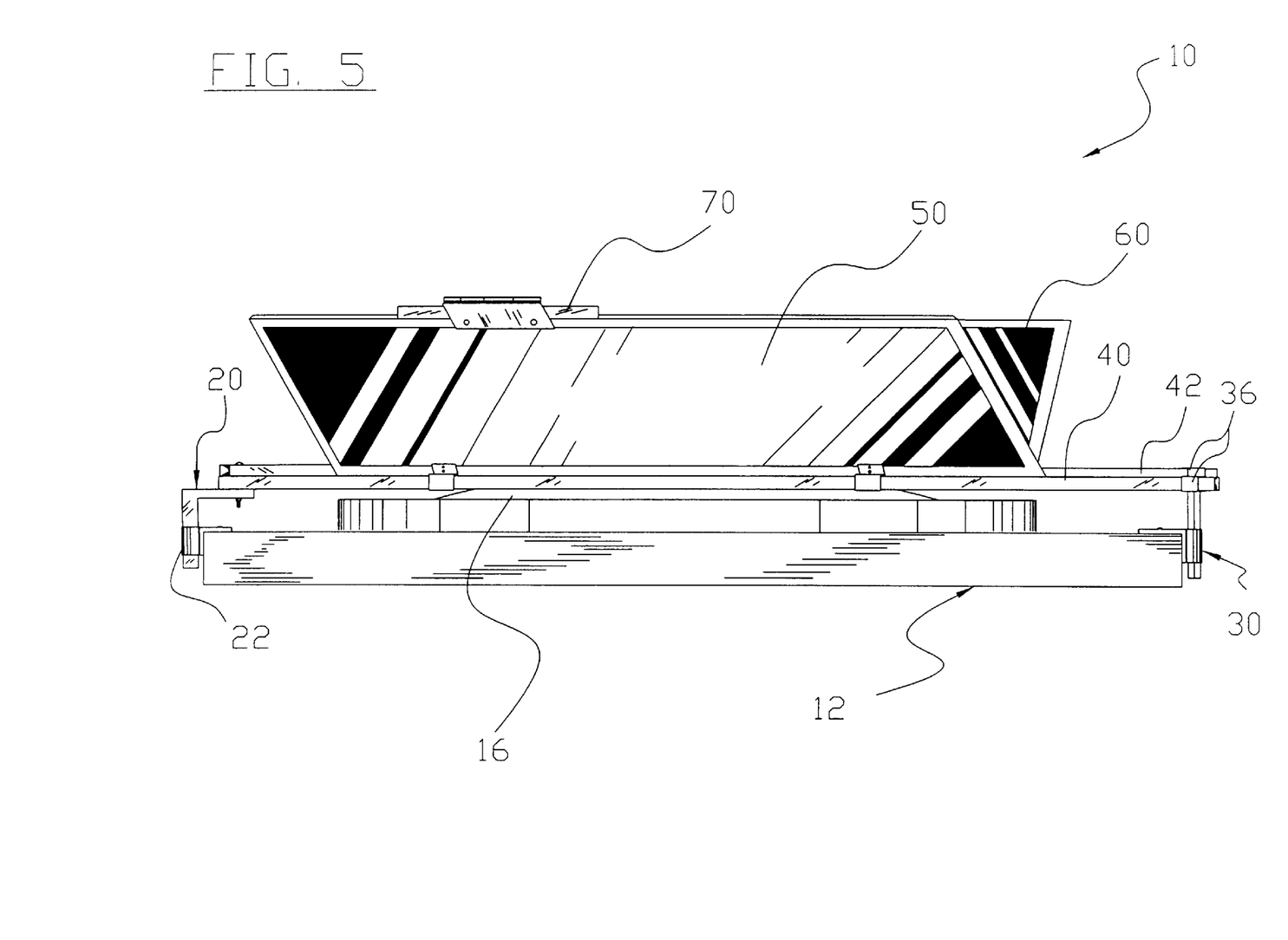
FIG. 5 is a side view of the present invention attached to a conventional skylight.
Figure 6:
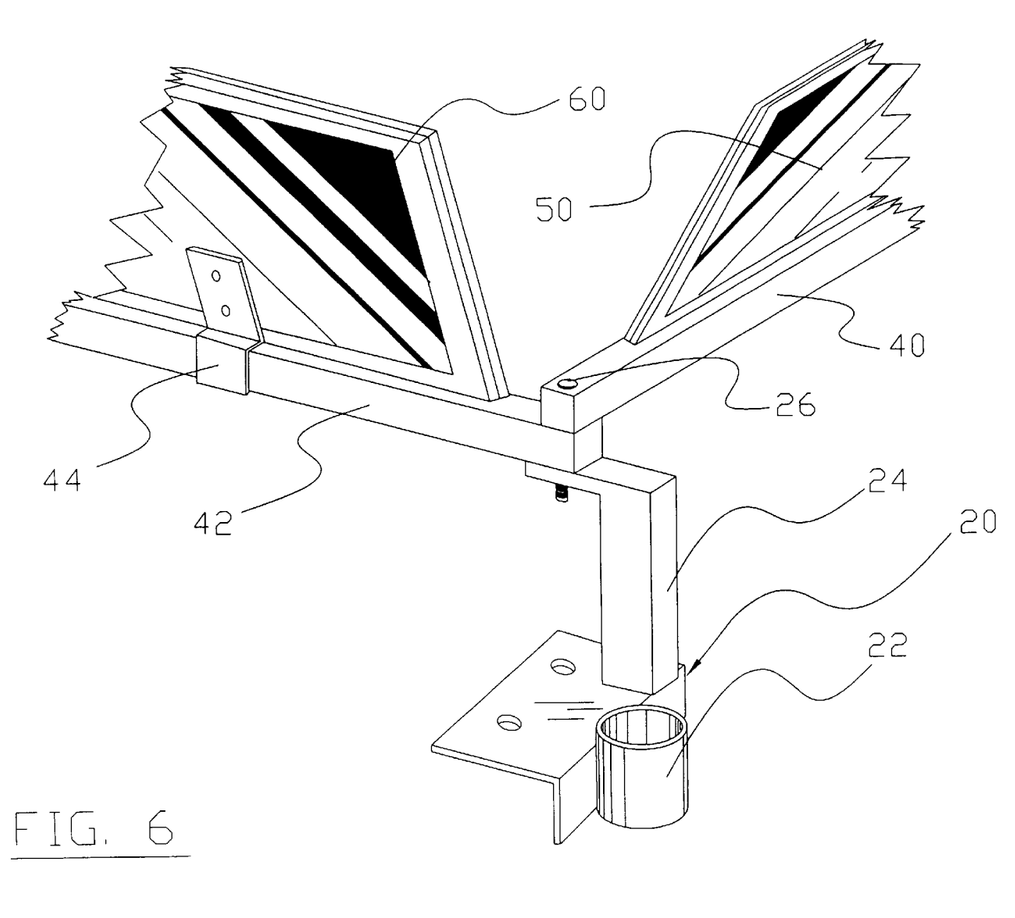
FIG. 6 is an exploded magnified view of the corner support structure.

As best shown in FIGS. 2, 5 and 6 of the drawings, a main bracket 20 is provided that is attachable to an edge of the frame 14 of the skylight 12. The main bracket 20 has a main tube 22 that has a flanged bracket that is attached to the frame 14 of the skylight 12 with the main tube 22 vertically orientated. The main bracket 20 further includes a main support member 24 having an orthogonal elongate portion that is slidably positioned within the main tube 22 as best shown in FIG. 6 of the drawings. The main support member 24 may be vertically adjusted within the main tube 22 to accommodate various heights and shapes of the skylight 12.

As shown in FIGS. 1 through 5 of the drawings, a pair of end brackets 30 are attachable to the end of the frame 14 opposite of the main bracket 20. The end brackets 30 which allows for the proper orientation of the device regardless of the skylight orientation as best shown in FIG. 1 of the drawings, are each comprised of a vertically orientated end tube 32 with a flanged bracket that is attachable to the frame 14 of the skylight 12. The end brackets 30 further each include an end support member 34 having a guide tube 36 attached traversely thereto as best shown in FIG. 2 of the drawings. The end support member 34 slidably and adjustably fits within the end tube 32 with the lumen of the guide tube 36 substantially traverse to the lumen of the end tube 32 as further shown in FIG. 2 of the drawings. The guide tube 36 slidably and adjustably receives one of the arms 40, 42 as best shown in FIG. 1 of the drawings.

As shown in FIGS. 1 through 4 of the drawings, a first arm 40 and a second arm 42 are pivotally attached to the main support member 24 by a pivot pin 26 extending through the arms 40, 42 and the main support member 24 for allowing the reflectors 50, 60 to be adjusted. The first arm 40 and the second arm 42 extend away from one another at an adjustable acute angle forming a V-shape as best shown in FIG. 3 of the drawings. The arms 40, 42 may have any elongate structure and shape as can be appreciated. The arms 40, 42 are of sufficient length so that the distal ends thereof slidably extend into and through the guide tube 36 of each of the end brackets 30 which allows for the proper orientation of the device regardless of the skylight orientation as best shown in FIG. 1 of the drawings.

Figure 4:
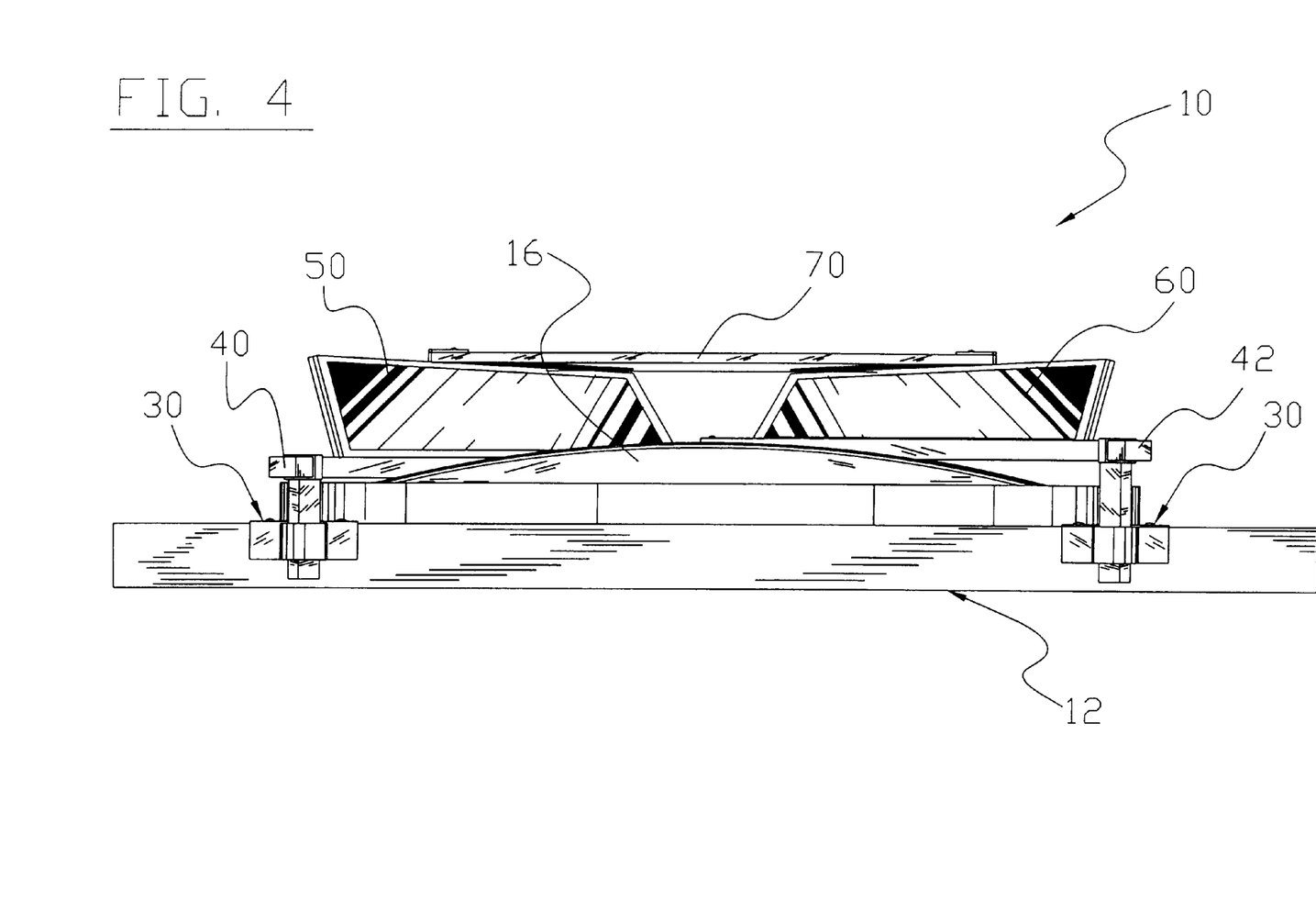
FIG. 4 is a rear view of the present invention attached to a conventional skylight.

As further shown in FIGS. 1 through 6 of the drawings, a first reflector 50 is attached to the first arm 40 by a plurality of attaching brackets 44. The first reflector 50 may be comprised of any reflective material such as a mirror, metal or plastic. The first reflector 50 has an inner side and an outer side. The inner side and the outer side of the first reflector 50 are both preferably reflective of sunlight for directing the sunlight through the pane 16 of the skylight 12. As best shown in FIG. 4 of the drawings, the first reflector 50 is angled away from the center of the pane 16 and the second reflector 60 so that the outer side thereof reflects sunlight from the sun positioned at a low angle with respective to the first reflector 50 through the pane 16 of the skylight 12. In addition, the inner side of the first reflector 50 reflects sunlight from the sun when positioned opposite of the first reflector 50. The angle of the reflectors 50, 60, 80 are adjustable which is dependent on the latitude of the installation.

As further shown in FIGS. 1 through 6 of the drawings, a second reflector 60 is attached to the second arm 42 by a plurality of attaching brackets 44. The second reflector 60 may be comprised of any reflective material such as a mirror, metal or plastic. The second reflector 60 has an inner side and an outer side. The inner side and the outer side of the second reflector 60 are both preferably reflective of sunlight for directing the sunlight through the pane 16 of the skylight 12. As best shown in FIG. 4 of the drawings, the second reflector 60 is angled away from the center of the pane 16 and the first reflector 50 so that the outer side thereof reflects sunlight from the sun positioned at a low angle with respective to the second reflector 60 through the pane 16 of the skylight 12. In addition, the inner side of the second reflector 60 reflects sunlight from the sun when positioned opposite of the second reflector 60. The angle of the reflectors 50, 60, 80 are adjustable which is dependent on the latitude of the installation.

A cross brace 70 is preferably attached to the upper portions of the first reflector 50 and the second reflector 60 by a plurality of attaching brackets 44 as best shown in FIGS. 1 through 4 of the drawings. The cross brace 70 preferably has a relatively broad structure for providing increased shading when the sun is positioned at a high angle with respect to the skylight 12. The cross brace 70 may be constructed of various sizes and can be repositioned along the reflectors 50, 60. The cross brace 70 also ensures that the reflectors 50, 60 are maintained in their desired position and angle as shown in FIGS. 1, 3 and 4 of the drawings.

Figure 7:
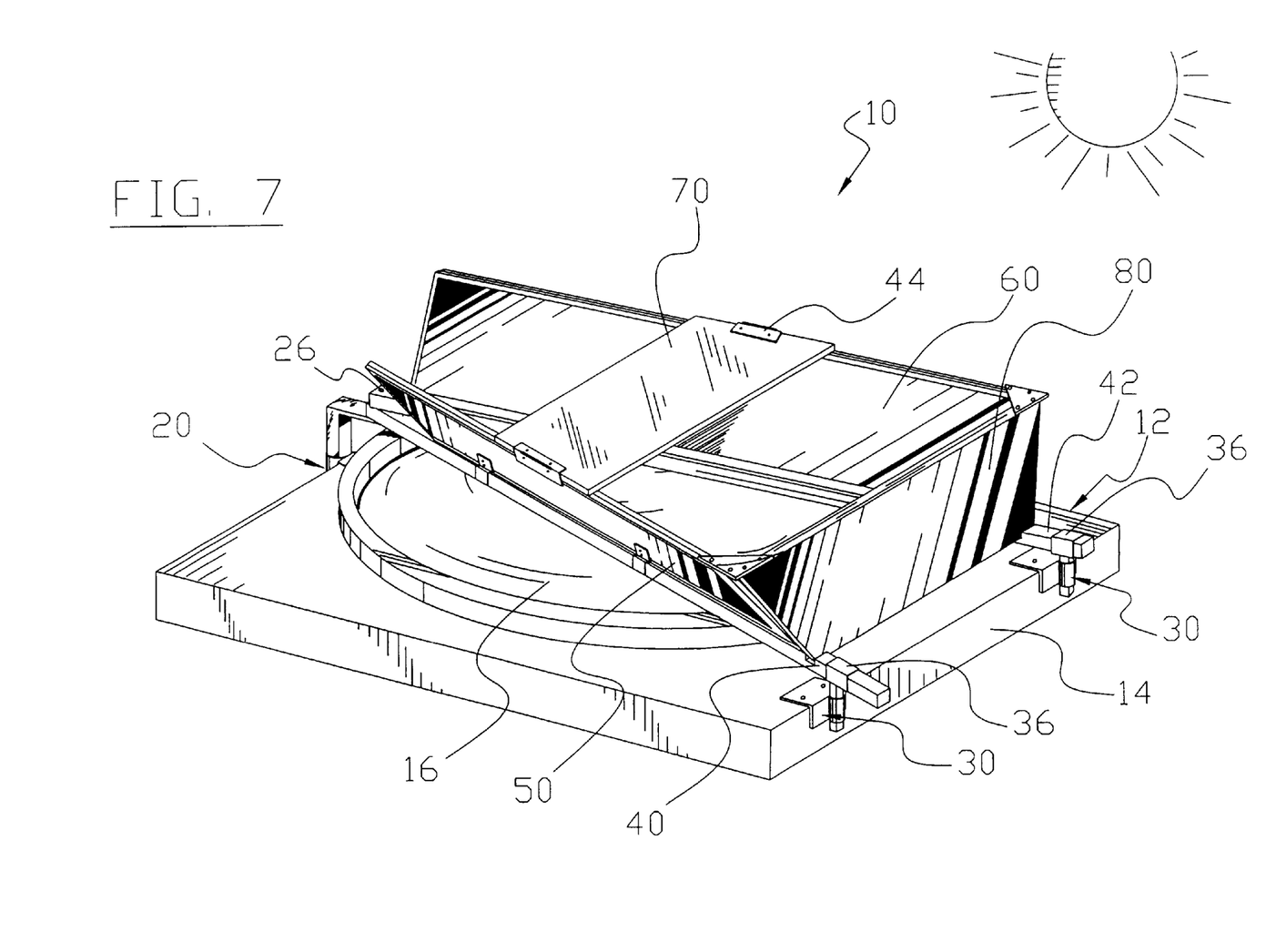
FIG. 7 is an upper perspective view of an alternative embodiment of the present invention attached to a conventional skylight having a third reflector.

In an alternative embodiment shown in FIG. 7 of the drawings, a third reflector 80 is attached between the first arm 40 and the second arm 42 adjacent the distal ends of the reflectors 50, 60. The third reflector 80 is attached to the arms 40, 42 and the reflectors 50, 60 via attaching brackets 44 as shown in FIG. 7 of the drawings. The third reflector 80 is preferably adjustable, positioned, and angled towards the skylight.

In use, the user attaches the main bracket 20 to the frame 14 of the skylight 12 as shown in FIG. 5 of the drawings. The pair of end brackets 30 are attached to the opposing side of the frame 14 as best shown in FIG. 1 of the drawings. The end brackets 30 and main bracket 20 must be positioned in the desired location so that the reflectors 50, 60 are properly positioned as to maximize solar radiation input as desired by user. More importantly, the main bracket 20 preferably is positioned upon the south side of the frame 14 so that the first reflector 50 and the second reflector 60 reflect the morning sun and the evening sun respectively. The user then positions the arms 40, 42 slidably into each guide tube 36 and then inserts the main support member 24 within the main tube 22 of the main bracket 20 as shown in FIGS. 1 through 3 of the drawings, height is adjustable corresponding to the installation needs. The user then attaches the cross brace 70 between the reflectors 50, 60 to ensure that the reflectors 50, 60 are at the desired position and angle. Early in the morning when the sun rises in the east of the skylight 12, the outer side of the first reflector 50 reflects the sunlight from the sun into the pane 16 of the skylight 12. The horizontal angle of this reflector allows adjustment to optimize solar input according to the user's needs. During mid-day when the sun is positioned southerly of the skylight 12 the cross brace 70 provides increased shading to the skylight 12 to reduce the solar radiation transmitted through the skylight 12. When the sun is positioned to the west during the evening hours the outer side of the second reflector 60 reflects the sunlight from the sun into the pane 16 of the skylight 12 thereby providing increased lighting within the interior of the building structure and moderating an over lighting condition near mid-day. The horizontal angle of this reflector allows adjustment to optimize solar input according to the user's needs.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A skylight solar reflective system, comprising:
    a main bracket;
    a first arm and a second arm pivotally attached to the main bracket, wherein said arms extend along a plane having an angle of at least 45 degrees with respect to a vertical plane;
    a pair of end brackets formed for adjustably receiving the ends of said first arm and said second arm opposite of said main bracket; and
    a first reflector and a second reflector attached to said first arm and said second arm respectively, wherein said reflectors each have a reflective surface.

2. The skylight solar reflective system of claim 1, wherein said first reflector is angled away from said second reflector, and wherein said second reflector is angled away from said first reflector.

3. The skylight solar reflective system of claim 1, wherein said first reflector and said second reflector each have an outer side and an inner side, wherein said outer side and said inner side are reflective.

4. The skylight solar reflective system of claim 1, wherein said main bracket is comprised of a main tube having a flanged portion and a main support member extendable within said main tube in a vertical manner.

5. The skylight solar reflective system of claim 1, wherein said first arm and said second arm are pivotally attached to said main support member by a pivot pin.

6. The skylight solar reflective system of claim 1, wherein each of said end brackets is comprised of an end tube with an extended flanged portion, an end support member slidably positioned within the end tube, and a guide tube attached to an upper end of said end support member for slidably receiving one of said arms.

7. The skylight solar reflective system of claim 1, wherein said first arm extends away from said second arm at an acute angle.

8. The skylight solar reflective system of claim 1, wherein said first arm and said second arm form a V-shape.

9. The skylight solar reflective system of claim 8, wherein a tip of said V-shape extends to a southerly direction.

10. The skylight solar reflective system of claim 1, wherein said first reflector is positioned so that said outer side of said first reflector reflects solar radiation from the sun during morning hours and wherein said second reflector is positioned so that said outer side of said second reflector reflects solar radiation from the sun during evening hours.

11. A skylight solar reflective system, comprising:
    a main bracket;
    a first arm and a second arm pivotally attached to the main bracket, wherein said arms extend along a plane having an angle of at least 45 degrees with respect to a vertical plane;
    a pair of end brackets formed for adjustably receiving the ends of said first arm and said second arm opposite of said main bracket;
    a first reflector and a second reflector attached to said first arm and said second arm respectively;
    a third reflector attached to said first arm and said second arm between a distal end of said first reflector and said second reflector, wherein said reflectors each have a reflective surface; and a cross brace attached between said first reflector and said second reflector.

12. The skylight solar reflective system of claim 11, wherein said first reflector is angled away from said second reflector, and wherein said second reflector is angled away from said first reflector.

13. The skylight solar reflective system of claim 11, wherein said first reflector and said second reflector each have an outer side and an inner side, wherein said outer side and said inner side are reflective.

14. The skylight solar reflective system of claim 11, wherein said main bracket is comprised of a main tube having a flanged portion and a main support member extendable within said main tube in a vertical manner.

15. The skylight solar reflective system of claim 11, wherein said first arm and said second arm are pivotally attached to said main support member by a pivot pin.

16. The skylight solar reflective system of claim 11, wherein each of said end brackets is comprised of an end tube with an extended flanged portion, an end support member slidably positioned within the end tube, and a guide tube attached to an upper end of said end support member for slidably receiving one of said arms.

17. The skylight solar reflective system of claim 11, wherein said cross brace is comprised of a broad structure for deflecting solar radiation from the sun when the sun is positioned at a high angle with respect to a skylight.

18. The skylight solar reflective system of claim 11, wherein said first arm and said second arm form a V-shape.

19. The skylight solar reflective system of claim 18, wherein a tip of said V-shape extends to a southerly direction.

20. The skylight solar reflective system of claim 11, wherein said first reflector is positioned so that said outer side of said first reflector reflects solar radiation from the sun during morning hours and wherein said second reflector is positioned so that said outer side of said second reflector reflects solar radiation from the sun during evening hours.

* * * * *